US012066780B2

(12) United States Patent
Nakamoto et al.

(10) Patent No.: US 12,066,780 B2
(45) Date of Patent: Aug. 20, 2024

(54) FIXING DEVICE INCLUDING NIP FORMATION PLATE HAVING A PLURALITY OF PROTRUDING PORTIONS AND IMAGE FORMING APPARATUS INCORPORATING SAME

(71) Applicants: Shogo Nakamoto, Kanagawa (JP); Arinobu Yoshiura, Kanagawa (JP); Daisuke Inoue, Tokyo (JP)

(72) Inventors: Shogo Nakamoto, Kanagawa (JP); Arinobu Yoshiura, Kanagawa (JP); Daisuke Inoue, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/132,991

(22) Filed: Apr. 11, 2023

(65) Prior Publication Data

US 2023/0375967 A1 Nov. 23, 2023

(30) Foreign Application Priority Data

May 23, 2022 (JP) ................................. 2022-083680
Jan. 20, 2023 (JP) ................................. 2023-007387

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01); *G03G 2215/2035* (2013.01); *G03G 2215/2038* (2013.01)

(58) Field of Classification Search
CPC ........... G03G 15/2017; G03G 15/2053; G03G 15/2064; G03G 2215/2035
USPC .......................................... 399/329; 219/216
See application file for complete search history.

(56) References Cited

U.S. PATENT DOCUMENTS 7,164,201 B2 1/2007 Manz et al.
8,604,610 B1 12/2013 Hughes
9,355,950 B1 5/2016 Bayerer
9,917,530 B2 3/2018 Dziuba et al.
10,523,131 B2 12/2019 Li et al.
10,674,626 B2 6/2020 Vatariu et al.
(Continued)

FOREIGN PATENT DOCUMENTS

CN 202026236 U 11/2011
CN 208781471 U 4/2019
(Continued)

*Primary Examiner* — Robert B Beatty
(74) *Attorney, Agent, or Firm* — XSENSUS LLP

(57) ABSTRACT

A fixing device includes an endless fixing rotator, a slide aid, a pressure rotator, a nip formation plate, a support, a heat source, and a reflector. The endless fixing rotator has flexibility. An inner circumferential surface of the fixing rotator slides over the slide aid. The pressure rotator contacts an outer circumferential surface of the fixing rotator. The nip formation plate is disposed inside the fixing rotator to contact the pressure rotator via the fixing rotator and the slide aid to form a nip between the fixing rotator and the pressure rotator. The nip formation plate has a thermal conductivity equal to or greater than 10 W/mK. The support supports the nip formation plate. The heat source is disposed inside the fixing rotator to heat the fixing rotator. The reflector reflects radiant heat from the heat source.

10 Claims, 7 Drawing Sheets

(56) References Cited

U.S. PATENT DOCUMENTS

| | | | |
|---|---|---|---|
| 2006/0120001 A1 | 6/2006 | Weber et al. | |
| 2014/0286684 A1 | 9/2014 | Takagi et al. | |
| 2015/0261155 A1 | 9/2015 | Yoshiura et al. | |
| 2015/0261157 A1 | 9/2015 | Yamano et al. | |
| 2017/0176906 A1 | 6/2017 | Sawada et al. | |
| 2022/0299920 A1 | 9/2022 | Shimada et al. | |
| 2023/0063779 A1 | 3/2023 | Shimada et al. | |

FOREIGN PATENT DOCUMENTS

| | | | | |
|---|---|---|---|---|
| CN | 212932850 U | 4/2021 | | |
| EP | 3690551 A1 * | 8/2020 | | |
| EP | 3699690 A1 * | 8/2020 | | |
| EP | 3757679 A1 * | 12/2020 | ......... | G03G 15/2039 |
| JP | 2004-094146 | 3/2004 | | |
| JP | 2015-075715 | 4/2015 | | |
| JP | 2017-116922 | 6/2017 | | |

* cited by examiner

FIXING DEVICE INCLUDING NIP FORMATION PLATE HAVING A PLURALITY OF PROTRUDING PORTIONS AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application Nos. 2022-083680, filed on May 23, 2022, and 2023-007387, filed on Jan. 20, 2023, in the Japan Patent Office, the entire disclosure of each of which is hereby incorporated by reference herein.

BACKGROUND

Technical Field

Embodiments of the present disclosure relate to a fixing device and an image forming apparatus incorporating the fixing device.

Related Art

In an image forming apparatus, after an unfixed toner image is transferred to a recording medium, the recording medium the unfixed toner image is conveyed to a fixing device, which fixes the unfixed toner image onto the recording medium under heat and pressure. Currently, there has been an increasing market demand for energy-saving and high-speed image forming apparatuses. When the speed is increased to improve the productivity, the amount of heat of a heat source increases accordingly.

The heat that is transferred from the heat source to a reflector and a support in the fixing device is to be effectively utilized to reduce power consumption.

SUMMARY

According to an embodiment of the present disclosure, a novel fixing device includes an endless fixing rotator, a slide aid, a pressure rotator, a nip formation plate, a support, a heat source, and a reflector. The endless fixing rotator has flexibility. An inner circumferential surface of the fixing rotator slides over the slide aid. The pressure rotator contacts an outer circumferential surface of the fixing rotator. The nip formation plate is disposed inside the fixing rotator to contact the pressure rotator via the fixing rotator and the slide aid to form a nip between the fixing rotator and the pressure rotator. The nip formation plate has a thermal conductivity equal to or greater than 10 W/mK. The support supports the nip formation plate. The heat source is disposed inside the fixing rotator to heat the fixing rotator. The reflector reflects radiant heat from the heat source.

Also described is a novel image forming apparatus incorporating the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
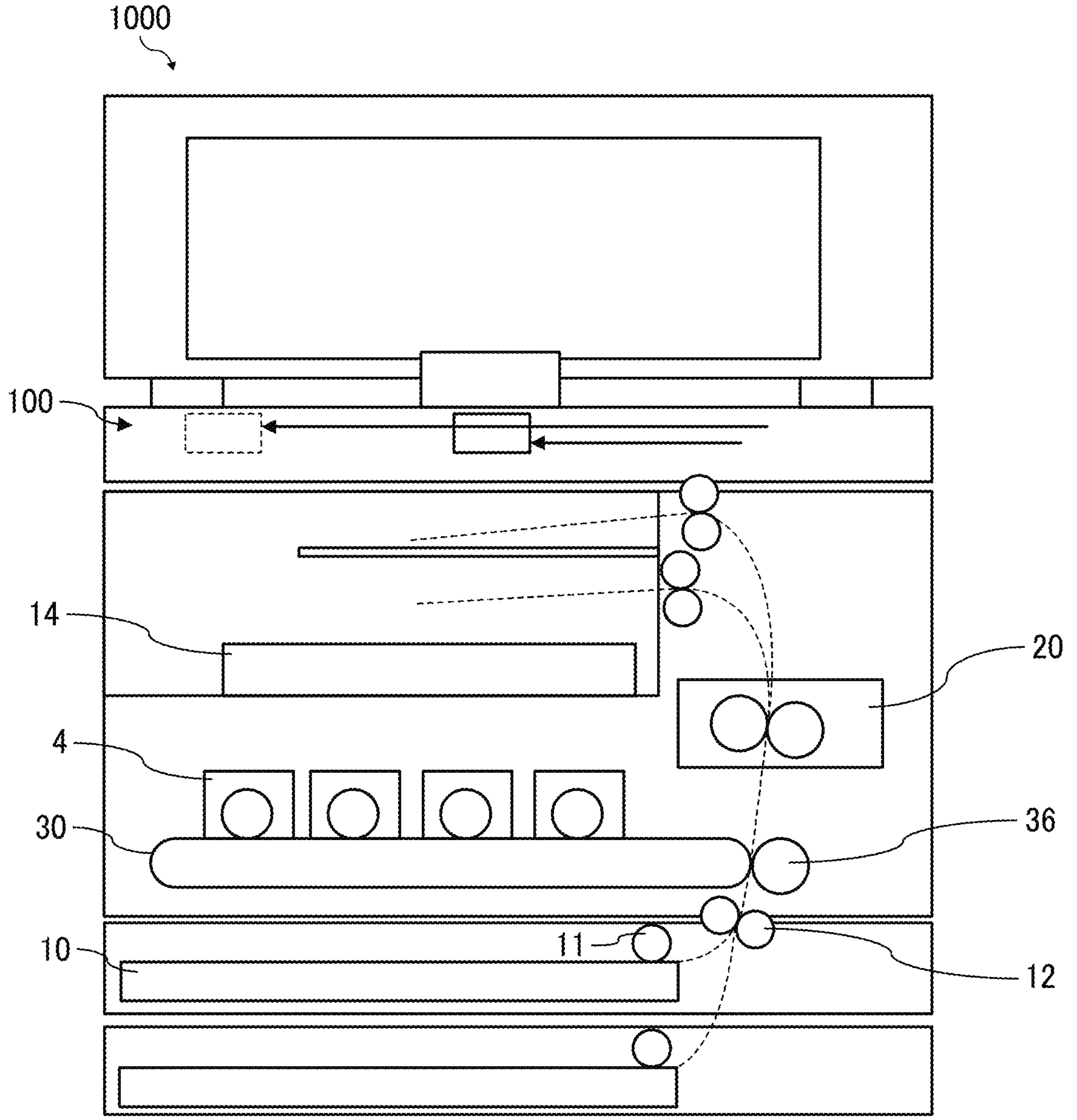
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a” “an,” and “the” are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, C, M, and Bk denote colors of yellow, cyan, magenta, and black, respectively. To simplify the description, these suffixes are omitted unless necessary.

As used herein, the term “connected/coupled” includes both direct connections and connections in which there are one or more intermediate connecting elements.

According to an embodiment of the present disclosure, a fixing device includes an endless fixing rotator, a slide aid, a pressure rotator, a nip formation plate, a support, a heat source, and a reflector. The endless fixing rotator has flexibility. An inner circumferential surface of the fixing rotator slides over the slide aid. The pressure rotator contacts an outer circumferential surface of the fixing rotator. The nip formation plate is disposed inside the fixing rotator and contacts the pressure rotator via the fixing rotator and the slide aid to form a nip between the fixing rotator and the pressure rotator. The support supports the nip formation plate. The heat source is disposed inside the fixing rotator to heat the fixing rotator. The reflector reflects radiant heat from the heat source. The nip formation plate has a thermal conductivity equal to or greater than 10 W/mK.

FIG. 1 is a schematic diagram illustrating the overall configuration of an image forming apparatus according to an embodiment of the present disclosure.

An image forming apparatus 1000 according to the present embodiment forms color images. The image forming apparatus 1000 includes four image forming devices 4 that are arranged side by side along a direction in which an intermediate transfer belt 30 is stretched. The four image forming devices 4 have identical configurations while containing toner as a developer in different colors of yellow (Y), cyan (C), magenta (M), and black (K) corresponding to color separation components of a color image.

Each of the four image forming devices 4 includes, for example, a latent image bearer, a charger, a developing device, and a cleaner. The latent image bearer is, for example, a drum-shaped photoconductor. The surface of the photoconductor is exposed by an exposure device. The charger charges the surface of the photoconductor. The developing device supplies toner to the surface of the photoconductor. The cleaner cleans the surface of the photoconductor.

Although not particularly limited, for example, a reading device 100 reads a document and obtains image data. The exposure device emits light to the photoconductor according to the image data to form a latent image, which may be referred to as an electrostatic latent image, on the photoconductor. The developing device develops the latent image to form a toner image on the photoconductor.

The toner image that is thus formed on the photoconductor is transferred to the intermediate transfer belt 30 by a transfer device.

The toner image that is thus transferred to the intermediate transfer belt 30 is further transferred to a recording medium, which may be referred to as a recording material, by a transfer roller 36.

The recording medium is fed from, for example, an input tray 10 to a registration roller pair 12 by a feed roller 11. The registration roller pair 12 conveys the recording medium to an area of contact between the intermediate transfer belt 30 and the transfer roller 36. Examples of the recording medium include, but are not limited to, plain paper, thick paper, thin paper, coated paper such as art paper, tracing paper, overhead projector (OHP) transparency, a postcard, and an envelope. Optionally, the image forming apparatus 1000 may include a bypass feeder that imports such recording media placed on a bypass tray into a housing of the image forming apparatus 1000.

The recording medium bearing the transferred toner image is conveyed to a fixing device 20. The fixing device 20 fixes the transferred toner image, which may be referred to as an unfixed image, onto the recording medium. The recording medium bearing the fixed toner image is ejected onto an output tray 14. Optionally, the image forming apparatus 1000 may images on both sides of the recording medium.

Figure 2:
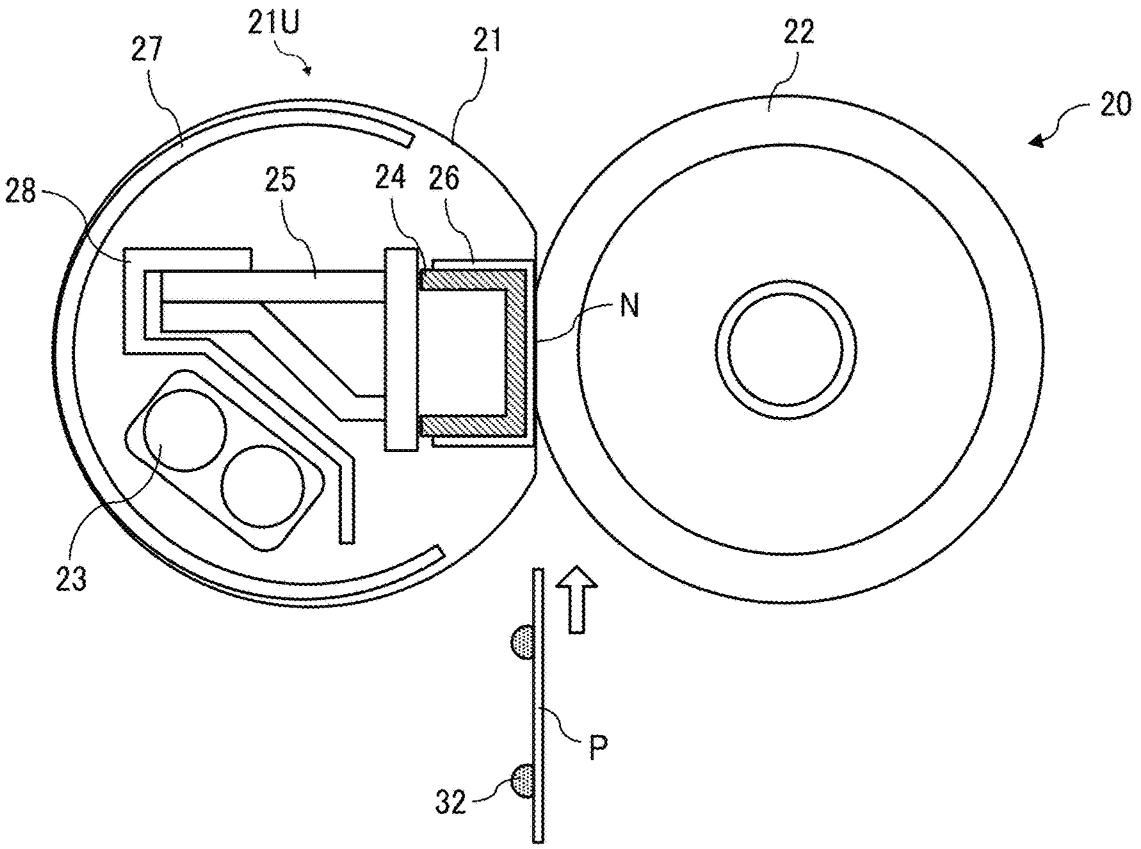
FIG. 2 is a schematic view of a fixing device according to an embodiment of the present disclosure.

FIG. 2 is a schematic view of the fixing device 20 according to the present embodiment.

The fixing device 20 according to the present embodiment includes, for example, a fixing belt 21, a belt support 27, a sliding sheet 26, a pressure roller 22, a nip formation plate 24, a stay 25, a heater 23, and a reflector 28. The fixing belt 21 and the components disposed inside a loop formed by the fixing belt 21 constitute a belt unit 21U, which is detachably coupled to the pressure roller 22.

The fixing belt 21, serving as a fixing rotator, is an endless belt having flexibility. The fixing belt 21 is supported by the belt support 27 and is rotatable. An axial direction of the fixing belt 21 is a direction perpendicular to the surface of the paper on which FIG. 2 is drawn. The fixing belt 21 is heated by radiant heat from the heater 23, which serves as a heat source disposed inside the loop formed by the fixing belt 21.

The fixing belt 21 includes, for example, a base layer and a release layer resting on the base layer. In other words, the base layer and the release layer serve as inner and outer circumferential surfaces of the fixing belt 21, respectively. The base layer is made of metal such as nickel or steel use stainless (SUS) or resin such as polyimide. The release layer is made of, for example, tetrafluoroethylene-perfluoroalkylvinylether copolymer (PFA) or polytetrafluoroethylene (PTFE). Optionally, an elastic layer made of rubber such as silicone rubber, silicone rubber foam, or fluoro rubber may be interposed between the base layer and the release layer. When the fixing belt 21 and the pressure roller 22 press and fix the unfixed toner image onto a recording medium, the elastic layer having a thickness of about 100 μm is elastically deformed and absorbs slight surface asperities in the fixing belt 21, thus preventing the variation in gloss of a toner image on the recording medium.

The fixing belt 21 preferably has a total thickness not greater than 1 mm and a loop diameter in a range of 20 mm to 40 mm to reduce thermal capacity. The base layer, the elastic layer, and the release layer of the fixing belt 21 are changeable in thickness as appropriate. For example, the base layer preferably has a thickness in a range of from 20 μm to 50 μm. The elastic layer preferably has a thickness in a range of from 100 μm to 300 μm. The release layer preferably has a thickness in a range of from 10 μm to 50 μm. To further reduce thermal capacity, preferably, the fixing belt 21 may have a total thickness not greater than 0.2 mm, and more preferably, not greater than 0.16 mm while having a loop diameter not greater than 30 mm.

The belt support 27 supports, for example, the fixing belt 21 at each end of the fixing belt 21.

The belt support 27 may be referred to as a belt holder. The belt support 27 may be, for example, a side-plate flange.

The sliding sheet 26, serving as a slide aid, is disposed such that the inner circumferential surface of the fixing belt 21 slides over the sliding sheet 26. As illustrated in FIG. 2, the sliding sheet 26 is located in contact with the nip formation plate 24. The shape of the sliding sheet 26 is not particularly limited. For example, the sliding sheet 26 may have a U-shaped cross section as illustrated in FIG. 2 or may be in another shape.

The sliding sheet 26 may be selected as appropriate. For example, the sliding sheet 26 may be a low-friction sheet made of a low-friction material. The sliding sheet 26 may be, for example, a sheet made of fibers of PTFE.

The pressure roller 22, serving as a pressure rotator, contacts the outer circumferential surface of the fixing belt 21. The pressure roller 22 includes, for example, a core, an elastic layer resting on the core, and a release layer resting on the elastic layer. The elastic layer is made of, for example, silicone rubber form or fluoro rubber. The release layer is made of, for example, PFA or PTFE to facilitate separation of the recording medium from the pressure roller 22. As the pressure roller 22 is pressed against the fixing belt 21 by a pressure applier such as a spring, the elastic layer of the pressure roller 22 is deformed and thus forms a fixing nip N having a given width at an area of pressure contact between the fixing belt 21 and the pressure roller 22. The fixing nip N may be referred to simply as the nip N.

The pressure roller 22 is rotated by, for example, a drive source such as a motor disposed inside the housing of the image forming apparatus 1000. As the pressure roller 22 is rotated, a driving force of the drive source is transmitted from the pressure roller 22 to the fixing belt 21 at the fixing nip N, thus rotating the fixing belt 21 with the pressure roller 22. While the fixing belt 21 rotates, a nip span of the fixing belt 21 at the fixing nip N is sandwiched between the pressure roller 22 and the nip formation plate 24. On the other hand, a circumferential span of the fixing belt 21 other than the nip span is guided by the side-plate flange at each end of the fixing belt 21 in the axial direction of the fixing belt 21.

Although the pressure roller 22 is solid in the present embodiment, the pressure roller 22 may be hollow in another embodiment. In a case where the pressure roller 22 is hollow, a heat source such as a halogen heater may be disposed inside the pressure roller 22.

The elastic layer of the pressure roller 22 may be made of solid rubber. Alternatively, in a case where no heat source is disposed inside the pressure roller 22, the elastic layer of the pressure roller 22 may be made of sponge rubber. The sponge rubber is preferable to the solid rubber because the sponge rubber has enhanced thermal insulation that draws less heat from the fixing belt 21.

The nip formation plate 24 is disposed inside the loop formed by the fixing belt 21 and contacts the pressure roller 22 via the fixing belt 21 and the sliding sheet 26 to form the nip N between the fixing belt 21 and the pressure roller 22. A detailed description of examples of the shape and material of the nip formation plate 24 is deferred.

The stay 25, serving as a support, supports the nip formation plate 24.

The heater 23, serving as a heat source, is disposed inside the loop formed by the fixing belt 21 and heat the fixing belt 21. The heater 23 heats the fixing belt 21 by, for example, radiant heat. The heat source may be, for example, a halogen heater. Alternatively, the heat source may be, for example, an induction heater, a resistive heat generator, or a carbon heater. As illustrated in FIG. 2, a plurality of heat sources may be disposed.

The reflector 28 reflects the radiant heat from the heater 23. The reflector 28 enhances the heating efficiency of the heater 23 to heat the fixing belt 21. In addition, the reflector 28 prevents the radiant heat from the heater 23 from heating the stay 25, thus reducing waste of energy.

When a recording medium P passes through the nip N, an unfixed image 32 on the recording medium P is fixed onto the recording medium P. FIG. 2 schematically indicates, by the thick arrow, a conveyance direction in which the recording medium P is conveyed.

In the present embodiment, the nip formation plate 24 has a thermal conductivity equal to or greater than 10 W/mK. This thermal conductivity of the nip formation plate 24 facilitates the thermal conduction from the reflector 28 to the fixing belt 21 and prevents damage to the reflector 28. In addition, the thermal conductivity of the nip formation plate 24 that is equal to or greater than 10 W/mK facilitates the thermal conduction from the heat source to the nip N so that the heat from the heat source can be effectively used at the nip N. Accordingly, the power consumption is reduced.

Figure 3A:
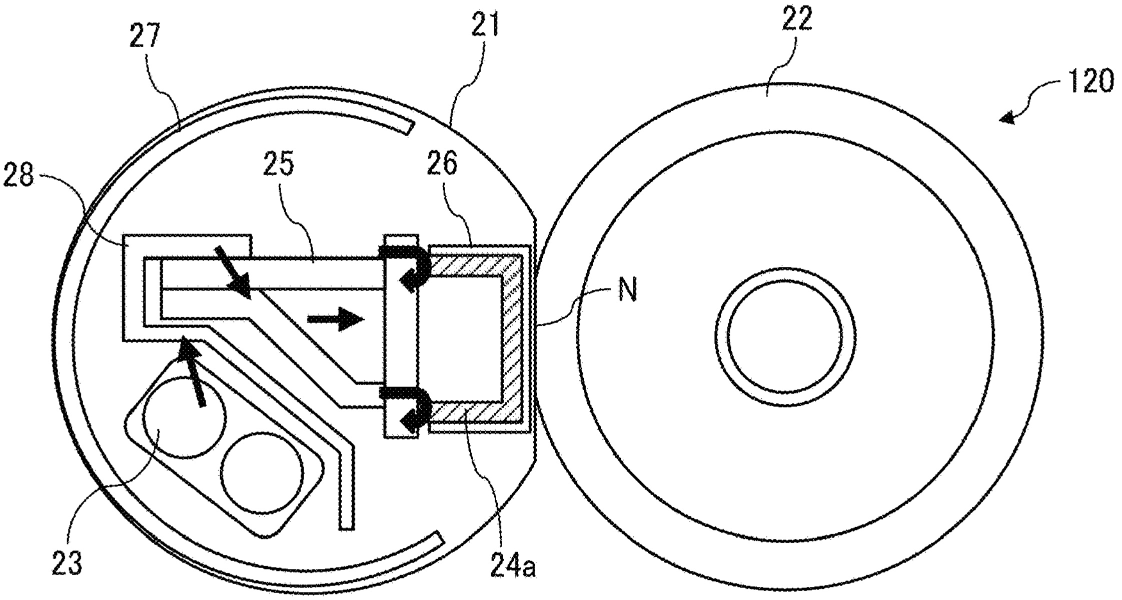
FIG. 3A is a schematic view of a fixing device according to a comparative example.
Figure 3B:
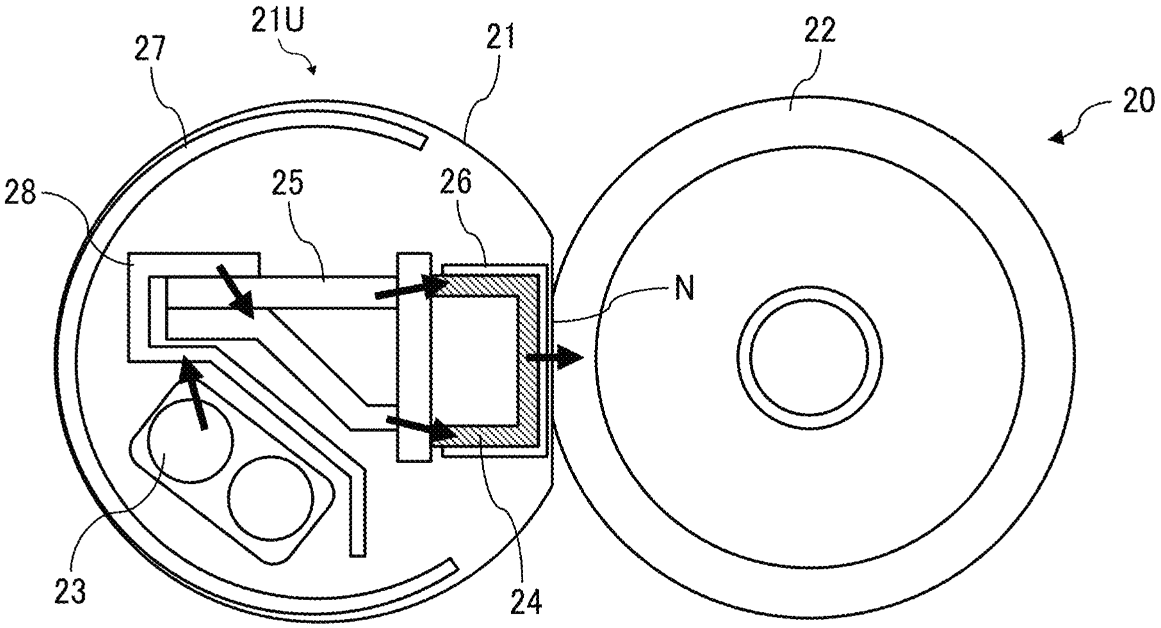
FIG. 3B is a schematic view of the fixing device of FIG. 2, indicating a heat conduction path.

Referring now to FIGS. 3A and 3B, a detailed description is given of the nip formation plate 24 according to the present embodiment.

FIG. 3A is a schematic view of a fixing device 120 according to a comparative example.

The fixing device 120 includes a nip formation plate **24*a*** having a thermal conductivity less than 10 W/mK.

In the present comparative example, the nip formation plate **24*a* is made of a material having a relatively low thermal conductivity. FIG. 3**A schematically indicates a heat conduction path by the arrows.

As illustrated in FIG. 3A, the heat is conducted from the heater 23 to the reflector 28. The heat is further conducted form the reflector 28 to the stay 25. In this comparative example, since the nip formation plate **24*a* has a relatively low thermal conductivity, the heat fails to be conducted, or is hardly conducted, from the stay 25 to the nip formation plate 24*a*. As a result, the temperatures of the reflector 28 and the stay 25 increase and may degrade the reflector 28. As the reflector 28 is degraded, the reflector 28 may be damaged. In addition, since the heat that is conducted to the reflector 28 and the stay 25** is not effectively utilized, the power consumption is not reduced.

FIG. 3B is a schematic view of the fixing device 20 according to the present embodiment.

FIG. 3B is substantially the same view as FIG. 2.

In the present embodiment, the nip formation plate 24 is made of a material having a relatively high thermal conductivity. As described above, the nip formation plate 24 has a thermal conductivity equal to or greater than 10 W/mK. Accordingly, the heat that has been conducted from the heater 23 to the stay 25 via the reflector 28 is further conducted to the nip formation plate 24. As a result, an excessive temperature rise of the reflector 28 is prevented. In other words, the degradation and damage of the reflector 28 are prevented. In the present embodiment, the heat is further conducted from the nip formation plate 24 to the nip N. In other words, the heat that has been transferred to the nip formation plate 24 is effectively utilized at the nip N. Accordingly, the power consumption is reduced.

In consideration of a case where the heat is conducted from the nip formation plate 24 to the nip N via the sliding sheet 26, the sliding sheet 26 is preferably made of a material having excellent heat resistance.

The material of the nip formation plate 24 may be selected as appropriate provided that the nip formation plate 24 has a thermal conductivity equal to or greater than 10 W/mK. The material of the nip formation plate 24 is preferably a metal material. In other words, the nip formation plate 24 is preferably made of metal. In this case, the nip formation plate 24 may easily have a thermal conductivity equal to or greater than 10 W/mK.

The metal may be selected as appropriate and is preferably, for example, aluminum or a steel sheet subjected to electrolytic zinc plating such as a steel electrolytic cold commercial (SECC) steel sheet. The SECC steel sheet or aluminum is preferable for the nip formation plate 24 because the SECC steel sheet or aluminum is easily processed.

The nip formation plate 24 is preferably a single plate member, which may be referred to simply as a plate. In this case, the heat is easily conducted from the reflector 28 and the stay 25 to the nip N. More preferably, the nip formation plate 24 is a single metal plate member, which may be referred to as a sheet metal.

The shape of the nip formation plate 24 may be selected as appropriate. As illustrated in FIG. 2, the nip formation plate 24 preferably has a shape in which a plate is bent twice and two ends of the plate are oriented in the same direction in a cross section perpendicular to the axial direction of the fixing belt 21. In short, the nip formation plate 24 is preferably has a U-shape. The U-shape is easily processed with enhanced accuracy.

Figure 4A:
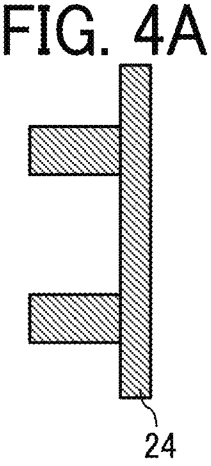
FIGS. 4A to 4C are schematic views of some examples of a nip formation plate.
Figure 4B:
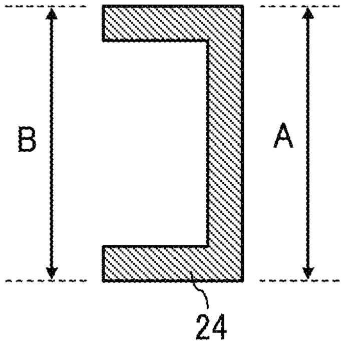
Figure 4C:
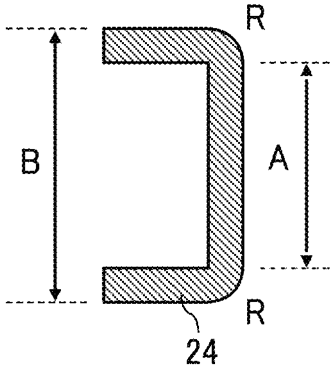

FIGS. 4A to 4C illustrate some example shapes of the nip formation plate 24 in the cross section perpendicular to the axial direction of the fixing belt 21.

The nip formation plate 24 that is illustrated in each of FIGS. 4A to 4C has a thermal conductivity equal to or greater than 10 W/mK. FIGS. 4A to 4C are views of the nip formation plate 24 in the cross section perpendicular to the axial direction of the fixing belt 21. The axial direction of the fixing belt 21 is parallel to a longitudinal direction of the nip formation plate 24. The longitudinal direction of the nip formation plate 24 may be referred to simply as the longitudinal direction.

Although the thermal conductivity of the nip formation plate 24 that is illustrated in FIG. 4A satisfies a requirement of the present embodiment, the nip formation plate 24 that is illustrated in FIG. 4A is not a single plate. Die-cast aluminum is an example of the metal having a relatively high thermal conductivity. However, if the nip formation plate 24 that is illustrated in FIG. 4A is made of die-cast aluminum, the processing cost increases. In addition, if the nip formation plate 24 is shaped as illustrated in FIG. 4A with a mold, the accuracy in molding is lowered.

FIG. 4B illustrates an example of the nip formation plate 24 made of a single sheet metal.

In the present example, the nip formation plate 24 is formed by simply bending the single sheet metal into a U-shape, which facilitates the achievement of high accuracy and reduces the manufacturing cost. Specifically, the nip formation plate 24 that is illustrated in FIG. 4B has a shape in which a plate is bent twice so that the two ends of the plate are oriented in the same direction.

In a case where the nip formation plate 24 is formed by bending a plate, a corner at a bent portion of the plate may be in a shape having an angle at which two straight lines intersect with each other as illustrated in FIG. 4B. However, the corner typically has a round part R as illustrated in FIG. 4C. In a case where the U-shaped nip formation plate 24 is formed by bending a plate, the nip formation plate 24 preferably has the round parts R so as not to hinder the rotation of the fixing belt 21.

In addition, the U-shaped nip formation plate 24 that is formed by bending a plate preferably satisfies a relation of B>A, where A represents the length of a nip-side face of the nip formation plate 24 and B represents the distance between the two ends of the nip formation plate 24 oriented in the same direction, in the cross-section perpendicular to the axial direction of the fixing belt 21 (i.e., the longitudinal direction of the nip formation plate 24). Note that the nip-side face of the nip formation plate 24 is a face facing the nip N. The length A may be referred to as the length of a nip-side straight portion of the nip formation plate 24. Note that the nip-side straight portion of the nip formation plate 24 is a straight portion facing the nip N.

The nip formation plate 24 that is formed by bending a plate with the round parts R and that satisfies the relation of B>A is less likely to interfere with the rotation of the fixing belt 21 and therefore the nip formation plate 24 does not affect the rotation of the fixing belt 21, compared with the nip formation plate 24 that does not have the round parts R and that does not satisfy the relation of B>A. In addition, the nip formation plate 24 that is formed by bending a plate with the round parts R and that satisfies the relation of B>A is stably supported by the stay 25. If the nip formation plate 24 that is formed by bending a plate into a U-shape does not satisfy the relation of B>A, in other words, if B is not greater than A, the stay 25 has some difficulties in supporting the nip formation plate 24.

Figure 5A:
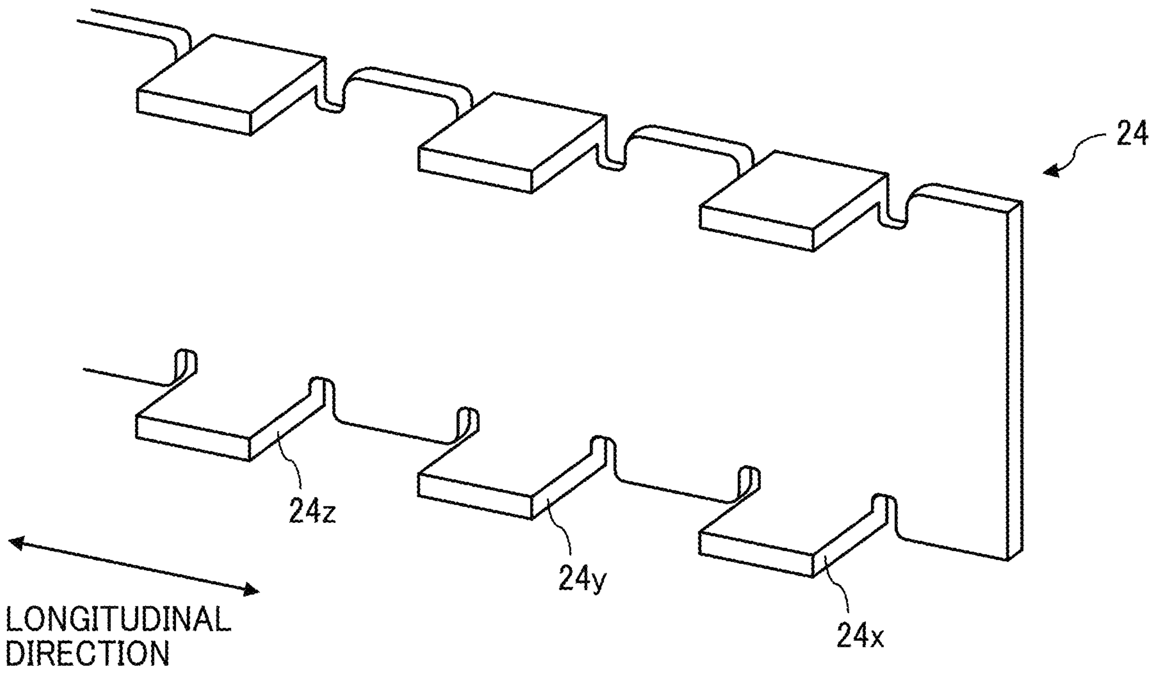
FIG. 5A is a schematic perspective view of a first example of a nip formation plate as a single plate.

FIG. 5A is a perspective view of a first example of the nip formation plate 24 that is formed by bending a single sheet metal twice.

Figure 5B:
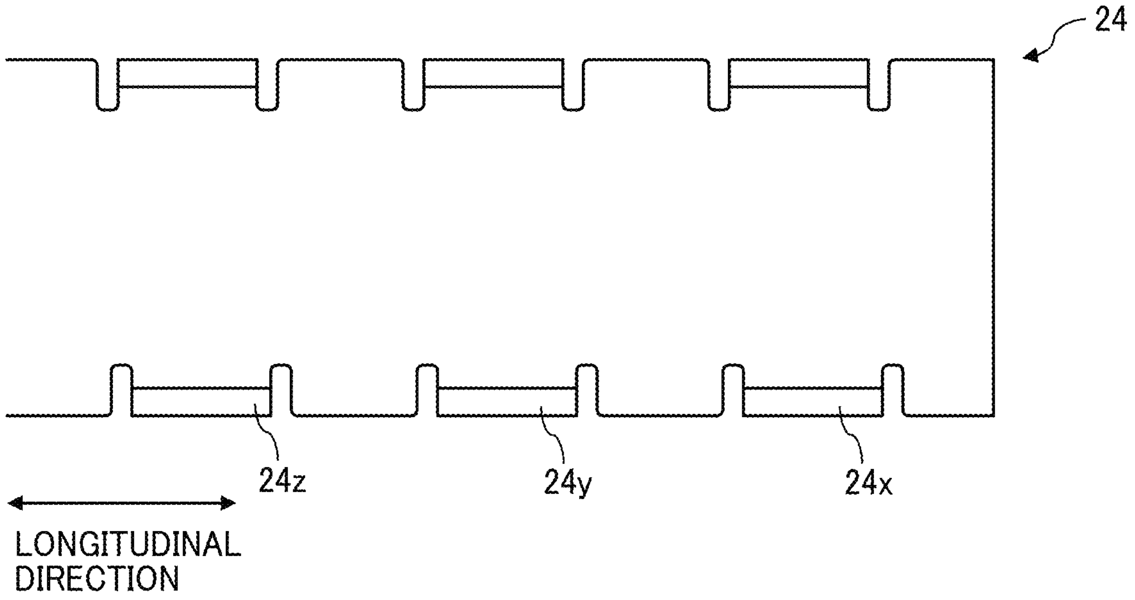
FIG. 5B is a schematic plan view of the nip formation plate of FIG. 5A.

FIG. 5B is a plan view of the nip formation plate 24 of FIG. 5A when the nip formation plate 24 is viewed from the inside of the fixing belt 21.

As illustrated in FIGS. 5A and 5B, the nip formation plate 24 of the present example includes a plurality of convex portions (for example, convex portions 24*x*. 24*y*, and 24*z*) projecting in a direction away from the nip N at two ends of bent portions at which the plate (i.e., the sheet metal) is bent twice. In other words, the nip formation plate 24 has a plurality of gaps at each bent portion at which the plate is bent. In other words, a plurality of convex portions may be bent one by one. For example, in a case where the convex portions of the nip formation plate 24 have relatively small heights c1, c2, and c3, the convex portions may be preferably bent one by one as illustrated in FIG. 5A to attain high accuracy in processing.

Figure 6A:
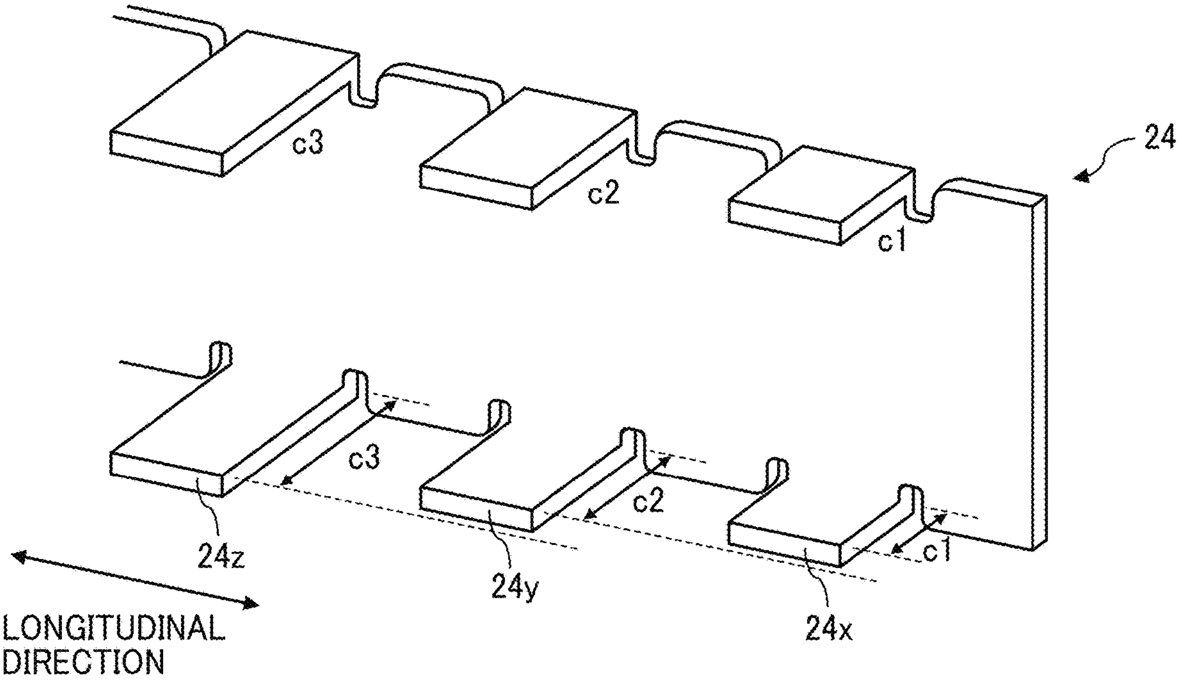
FIG. 6A is a schematic perspective view of a second example of the nip formation plate as a single plate.

FIG. 6A is a perspective view of a second example of the nip formation plate 24 that is formed by bending a single sheet metal twice.

Figure 6B:
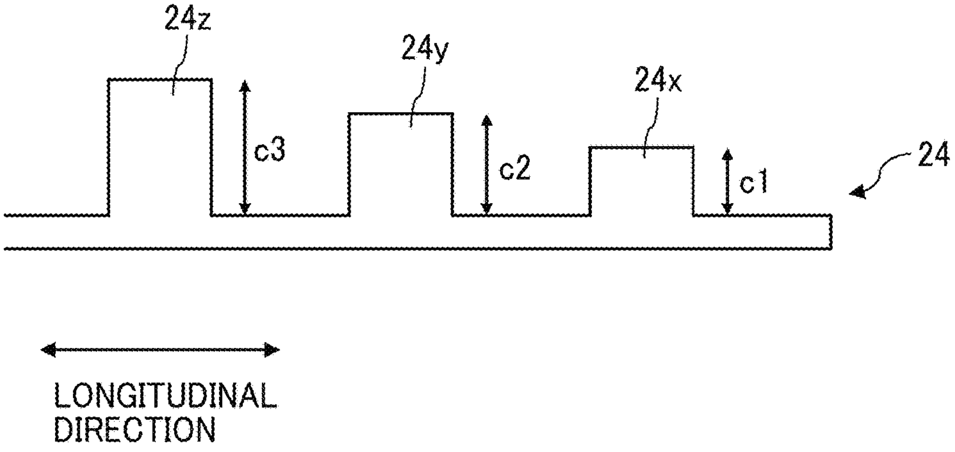
FIG. 6B is a schematic side view of the nip formation plate of FIG. 6A.

FIG. 6B is a side view of the nip formation plate 24 of FIG. 6A.

In the present example illustrated in FIGS. 6A and 6B like the example illustrated in FIGS. 5A and 5B, the nip formation plate 24 includes a plurality of convex portions (for example, the convex portions 24*x*, 24*y*, and 24*z*) projecting in the direction away from the nip N at two ends of bent portions at which the plate (i.e., the sheet metal) is bent twice. In the present example, the plurality of convex portions is highest at the center in the axial direction of the fixing belt 21 (i.e., the longitudinal direction of the nip formation plate 24) and is lowered toward the ends of the nip formation plate 24 in the axial direction of the fixing belt 21 (i.e., the longitudinal direction of the nip formation plate 24). In other words, the plurality of convex portions is highest at a longitudinal center of the nip formation plate 24 and is lowered toward longitudinal ends of the nip formation plate 24. For example, the convex portion 24*z* at the longitudinal center of the nip formation plate 24 has a greater height c3 than the other convex portions illustrated in FIGS. 6A and 6B. By contrast, the convex portion 24*x* at the longitudinal end of the nip formation plate 24 has a smaller height c1 than the other convex portions illustrated in FIGS. 6A and 6B. The example that is illustrated in FIGS. 6A and 6B satisfies a relation of c1<c2<c3.

FIGS. 6A and 6B illustrate about half the length of the nip formation plate 24. Similarly, in another half length of the nip formation plate 24, the plurality of convex portions is highest at the longitudinal center of the nip formation plate 24 and is lowered toward the longitudinal end of the nip formation plate 24. In other words, the U-shape of the nip formation plate 24 that is formed by bending a single plate into a U-shape is highest at the longitudinal center of the nip formation plate 24 and is lowered toward the longitudinal ends of the nip formation plate 24.

In the present embodiment, the stay 25 is held at the ends with no holding mechanism at the center. As the ends of the stay 25 are held, the stay 25 can support the force received from the nip N at the ends of the stay 25. On the other hand, as the center of the stay 25 is not held, the stay 25 may fail to support the force from the nip N at the center of the stay 25 and therefore the center of the stay 25 may be easily bent. In the present example illustrated in FIGS. 6A and 6B, the nip formation plate 24 keeps the nip N stable even when the stay 25 is bent, with the plurality of convex portions being the highest at the longitudinal center of the nip formation plate 24 and being lowered toward the ends of the nip formation plate 24.

In a case where the convex portions are not formed at the two ends of the bent portions at which a single plate is bent twice, the bent portions are highest at the longitudinal center of the nip formation plate 24 and are lowered toward the ends of the nip formation plate 24.

FIGS. 7A to 7D are views of a third example of the nip formation plate 24 that is formed by bending a single plate.

Figure 7A:
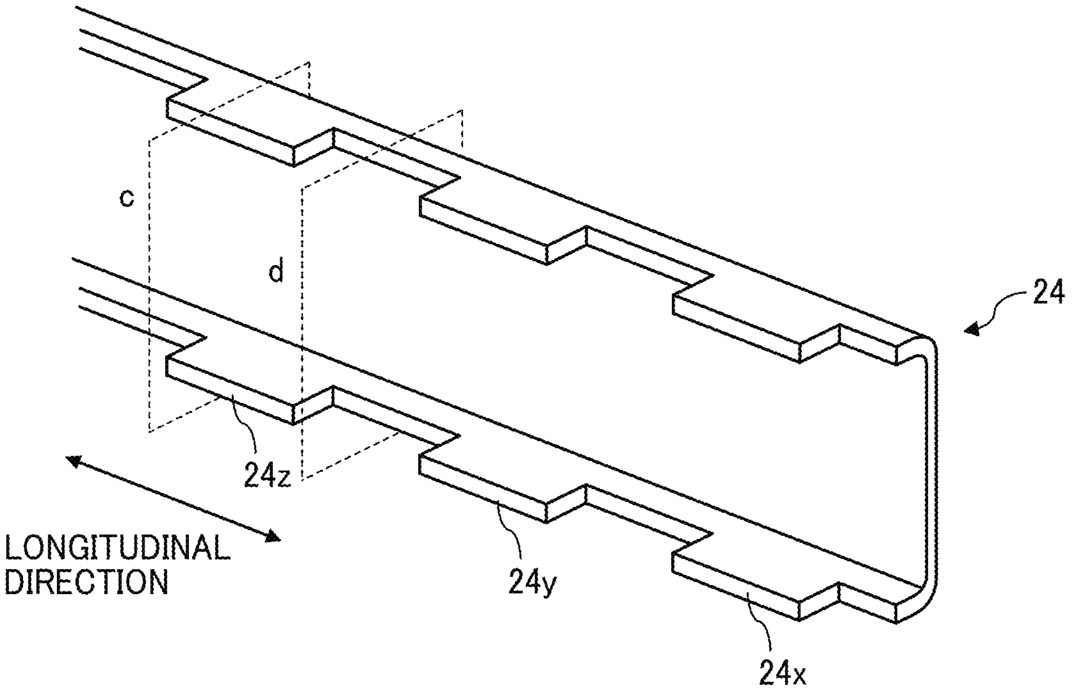
FIG. 7A is a schematic perspective view of a third example of the nip formation plate as a single plate.

Specifically, FIG. 7A is a perspective view of the nip formation plate 24 of the present example.

Figure 7B:
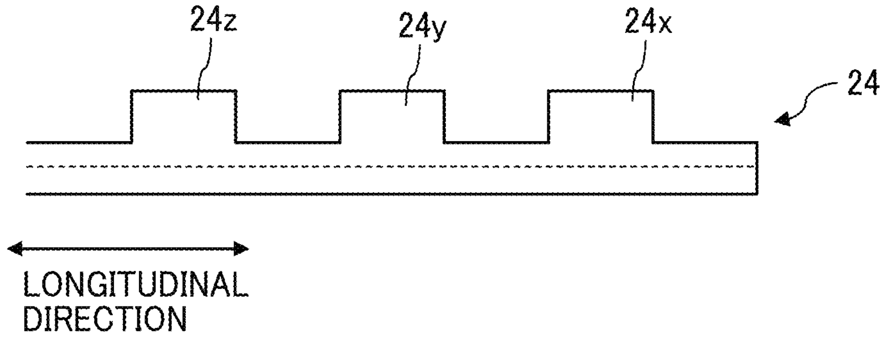
FIG. 7B is a schematic side view of the nip formation plate of FIG. 7A.

In the present example like the examples described above, the nip formation plate 24 includes a plurality of convex portions (for example, the convex portions 24*x*, 24*y*, and 24*z*) projecting in the direction away from the nip N at two ends of bent portions at which the plate (i.e., the sheet metal) is bent twice, as illustrated in FIGS. 7A and 7B.

FIG. 7B is a side view of the nip formation plate 24 of FIG. 7A.

Figure 7C:
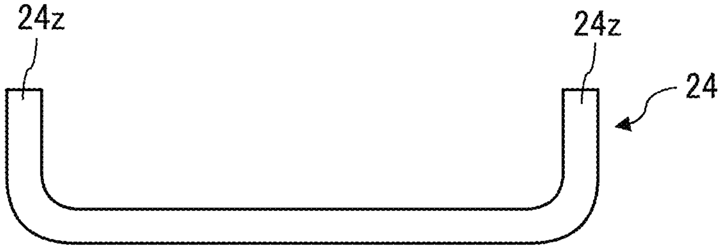
FIG. 7C is a schematic cross-sectional view of the nip formation plate of FIG. 7A.

FIG. 7C is a cross-sectional view of a portion "c" of the nip formation plate 24 illustrated in FIG. 7A.

Figure 7D:
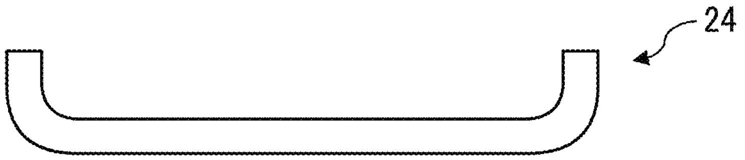
FIG. 7D is another schematic cross-sectional view of the nip formation plate of FIG. 7A.

FIG. 7D is a cross-sectional view of a portion "d" of the nip formation plate 24 illustrated in FIG. 7A.

In the present example, adjacent convex portions of the plurality of convex portions have a continuous base when a side face of the nip formation plate 24 is viewed. Note that the side face is a face of the nip formation plate 24 that is viewed in a direction in which the recording medium P enters the nip N. FIG. 7B schematically indicates, by the broken line, the height of the unbent portion of the plate. Since the adjacent convex portions have a continuous base, the continuous portion between the convex portions is higher than a portion defined by the broken line. Since the adjacent convex portions have a continuous base, the continuous portion projects in the direction away from the nip N in the cross-section at the portion "d" of the nip formation plate 24 as illustrated in FIG. 7D. Note that the side face of the nip formation plate 24 described above is a face viewed in a direction along a direction perpendicular to the axial direction of the fixing belt 21.

For example, in a case where the convex portions of the nip formation plate 24 are bent one by one to form a U-shape as illustrated in FIG. 5A, time and labor are needed to produce the nip formation plate 24 and high accuracy may be difficult to achieve. In this case, since the adjacent convex portions do not have a continuous base, the nip formation plate 24 may be easily bent by a force generated when the nip N is formed. When the nip formation plate 24 is thus bent, the nip N may not be formed as intended.

By contrast, in the present example, since the adjacent convex portions have a continuous base, the nip formation plate 24 has increased strength against the force generated when the nip N is formed and is hardly bent. In the present example, since the plate is bent once on each side, the accuracy is enhanced as compared with a case where the convex portions are bent one by one.

In a case where the convex portions having a continuous base are formed as illustrated in FIGS. 7A and 7B with a typically used resin having a relatively low thermal conductivity, shrinkage may occur in a molding process using a mold because of variation in thickness. Such shrinkage lowers the accuracy at the ends of the U-shape when the plate is bent into the U-shape. On the other hand, in the present example like the examples described above, the nip formation plate 24 is preferably made of metal. In a case where the nip formation plate 24 that is illustrated in FIGS. 7A to 7D is made of metal, the accuracy at the ends of the U-shape is enhanced when the plate is bent into the U-shape.

Note that the example illustrated in FIGS. 7A to 7D satisfies the relation of B>A. From this point of view, the example that is illustrated in FIGS. 7A to 7D has a preferable configuration. More preferably, in the example illustrated in FIGS. 7A to 7D like the example illustrated in FIGS. 6A and 6B, the plurality of convex portions is highest at the center in the axial direction of the fixing belt 21 and is lowered toward the ends of the nip formation plate 24 in the axial direction of the fixing belt 21. In other words, the plurality of convex portions is highest at the longitudinal center of the nip formation plate 24 and is lowered toward the ends of the nip formation plate 24.

Figure 8:
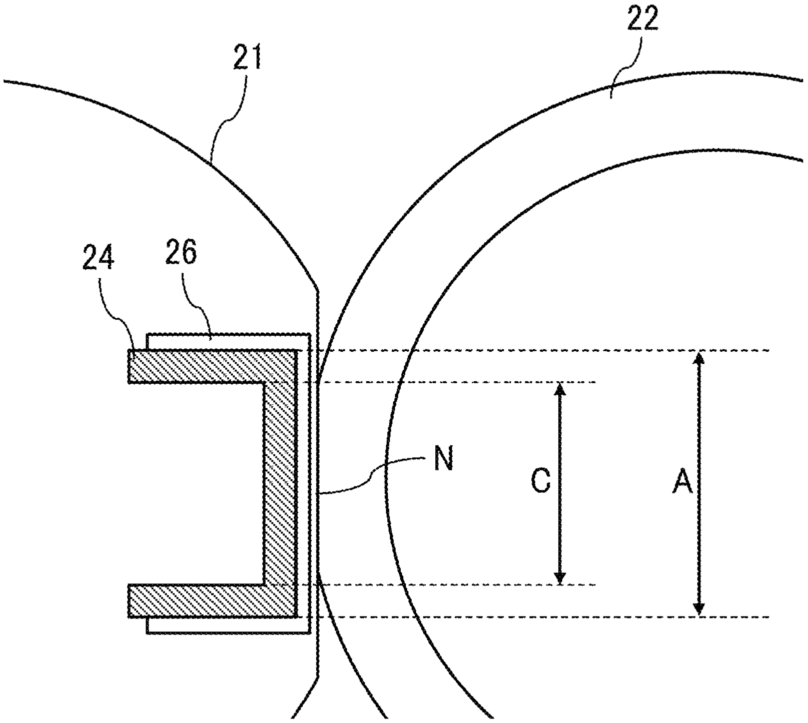
FIG. 8 is a diagram illustrating an example relation of a nip formation plate and a nip in the fixing device of FIG. 2.

FIG. 8 illustrates an example relation between the nip formation plate 24 and the nip N.

In the present embodiment, the nip formation plate 24 preferably satisfies a relation of A>C, where A represents the length of the nip-side face of the nip formation plate 24 and C represents the width of the nip N, in the cross-section perpendicular to the axial direction of the fixing belt 21. As described above, the nip-side face of the nip formation plate 24 is the face facing the nip N. In this case, the stability of the nip N is enhanced.

As described above, the length A may be referred to as the length of the nip-side straight portion of the nip formation plate 24. The nip-side straight portion of the nip formation plate 24 is the straight portion facing the nip N.

To satisfy the relation of A>C, for example, the shape of the nip formation plate 24, the layer structure of the pressure roller 22, the pressing force of the pressure roller 22, or a combination thereof may be selected as appropriate. Alternatively, any other approaches may be taken to satisfy the relation of A>C.

Figure 9:
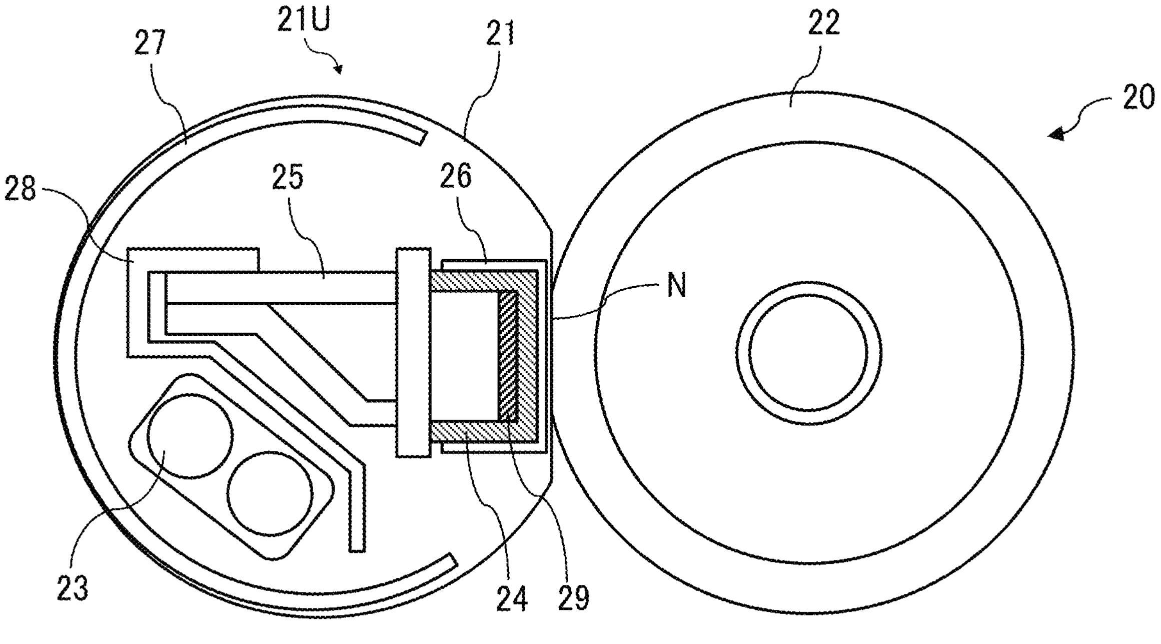
FIG. 9 is a schematic view of another example of the fixing device according to the above embodiment of the present disclosure.

FIG. 9 illustrates another example of the fixing device 20 according to the present embodiment.

When the temperature of the reflector 28 is not sufficiently lowered, the fixing device 20 may preferably radiate heat further. In such a case, preferably, a sheet metal 29 is additionally disposed. As illustrated in FIG. 9, the sheet metal 29 in the present example is not in contact with the stay 25. Instead, the sheet metal 29 is in contact with the nip formation plate 24 and opposite the nip N via the nip formation plate 24, the sliding sheet 26, and the fixing belt 21.

The thermal conductivity of the sheet metal 29 is preferably equal to or greater than the thermal conductivity of the nip formation plate 24. In the present example, the sheet metal 29 has a thermal conductivity equal to or greater than the thermal conductivity of the nip formation plate 24.

The sheet metal 29 as described above is disposed as a part of the nip formation plate 24 and increases the thermal capacity of the nip formation plate 24 as a whole, allowing further heat radiation. As a result, the temperature rise of the reflector 28 is reduced. Accordingly, the degradation and damage of the reflector 28 are prevented.

The number of the sheet metal 29 may be one or more. The above-described effect can be obtained by using one sheet metal 29 having a thermal conductivity equal to or greater than the thermal conductivity of the nip formation plate 24. Radiation of heat is facilitated by further adding the sheet metal 29 having a thermal conductivity equal to or greater than the thermal conductivity of the nip formation plate 24. When the radiation of heat excessively drops the temperature, a sheet metal having a thermal conductivity smaller than the thermal conductivity of the nip formation plate 24 may be added to reduce the radiation of heat from the nip formation plate 24.

Now, a description is given of some aspects of the present disclosure.

According to a first aspect, a fixing device includes an endless fixing rotator, a slide aid, a pressure rotator, a nip formation plate, a support, a heat source, and a reflector.

The endless fixing rotator has flexibility. An inner circumferential surface of the fixing rotator slides over the slide aid. The pressure rotator contacts an outer circumferential surface of the fixing rotator. The nip formation plate is disposed inside the fixing rotator and contacts the pressure rotator via the fixing rotator and the slide aid to form a nip between the fixing rotator and the pressure rotator. The support supports the nip formation plate. The heat source is disposed inside the fixing rotator to heat the fixing rotator. The reflector reflects radiant heat from the heat source. The nip formation plate has a thermal conductivity equal to or greater than 10 W/mK.

According to a second aspect, in the fixing device of the first aspect, the nip formation plate is made of metal.

According to a third aspect, in the fixing device of the first or second aspect, the nip formation plate is a single plate.

According to a fourth aspect, in the fixing device of the third aspect, the nip formation plate has a shape in which the single plate is bent twice and two ends of the single plate are oriented in the same direction in a cross-section perpendicular to an axial direction of the fixing rotator.

According to a fifth aspect, in the fixing device of the third or fourth aspect, the nip formation plate includes a plurality of convex portions projecting in a direction away from the nip at two ends of bent portions at which the single plate is bent twice.

According to a sixth aspect, in the fixing device of the fifth aspect, the plurality of convex portions is highest at a center in an axial direction of the fixing rotator and is lowered toward ends of the nip formation plate in the axial direction of the fixing rotator.

According to a seventh aspect, in the fixing device of the fifth or sixth aspect, adjacent convex portions of the plurality of convex portions have a continuous base when a side face of the nip formation plate is viewed. The side face is a face of the nip formation plate that is viewed in a direction in which a recording medium enters the nip.

According to an eighth aspect, in the fixing device of any one of the fourth to seventh aspects, the nip formation plate satisfies a relation of B>A, where A represents the length of a nip-side face of the nip formation plate, the nip-side face facing the nip, and B represents a distance between the two ends of the nip formation plate oriented in the same direction, in the cross-section perpendicular to the axial direction of the fixing rotator.

According to a ninth aspect, in the fixing device of any one of the fourth to eighth aspects, the nip formation plate satisfies a relation of A>C, where A represents the length of a nip-side face of the nip formation plate, the nip-side face facing the nip, and C represents the width of the nip, in the cross-section perpendicular to the axial direction of the fixing rotator.

According to a tenth aspect, in the fixing device of any one of the first to ninth aspects, the reflector is in contact with the support.

According to an eleventh aspect, the fixing device of any one of the first to tenth aspects further includes a sheet metal separate from the support. The sheet metal is in contact with the nip formation plate and opposite the nip via the nip formation plate, the slide aid, and the fixing rotator. The sheet metal has a thermal conductivity equal to or greater than the thermal conductivity of the nip formation plate.

According to a twelfth aspect, an image forming apparatus includes the fixing device of any one of the first to eleventh aspects.

According to one aspect of the present disclosure, a fixing device prevents the deterioration of a reflector and effectively utilizes heat transferred from a heat source to the reflector and a support, to reduce power consumption.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

an endless fixing rotator having flexibility;

a slide aid over which an inner circumferential surface of the fixing rotator slides;

a pressure rotator to contact an outer circumferential surface of the fixing rotator;

a nip formation plate disposed inside the fixing rotator to contact the pressure rotator via the fixing rotator and the slide aid to form a nip between the fixing rotator and the pressure rotator, the nip formation plate having a thermal conductivity equal to or greater than 10 W/mK;

a support supporting the nip formation plate;

a heat source disposed inside the fixing rotator to heat the fixing rotator; and a reflector configured to reflect radiant heat from the heat source, wherein the nip formation plate is a single plate, the nip formation plate includes a plurality of protruding portions projecting in a direction away from the nip at two ends of bent portions at which the single plate is bent twice, and heights of the plurality of protruding portions have one highest at a center in an axial direction of the fixing rotator and are lowered continuously toward ends of the nip formation plate in the axial direction of the fixing rotator.

2. The fixing device according to claim 1, wherein the nip formation plate is made of metal.

3. The fixing device according to claim 1, wherein the nip formation plate has a shape in which the single plate is bent twice and two ends of the single plate are oriented in a same direction in a cross-section perpendicular to an axial direction of the fixing rotator.

4. The fixing device according to claim 3, wherein the nip formation plate satisfies a relation of B>A, where A represents a length of a nip-side face of the nip formation plate, the nip-side face facing the nip, and B represents a distance between the two ends of the nip formation plate oriented in the same direction, in the cross-section perpendicular to the axial direction of the fixing rotator.

5. The fixing device according to claim 3, wherein the nip formation plate satisfies relation of A>C, where A represents a length of a nip-side face of the nip formation plate, the nip-side face facing the nip, and C represents a width of the nip, in the cross-section perpendicular to the axial direction of the fixing rotator.

6. The fixing device according to claim 1, wherein adjacent protruding portions of the plurality of protruding portions have a continuous base when a side face of the nip formation plate is viewed, and wherein the side face is a face of the nip formation plate that is viewed in a direction in which a recording medium enters the nip.

7. The fixing device according to claim 1, wherein the reflector is in contact with the support.

8. The fixing device according to claim 1, further comprising a sheet metal separate from the support, wherein the sheet metal is in contact with the nip formation plate and opposite the nip via the nip formation plate, the slide aid, and the fixing rotator, and wherein the sheet metal has a thermal conductivity equal to or greater than the thermal conductivity of the nip formation plate.

9. An image forming apparatus comprising the fixing device according to claim 1.

10. The fixing device according to claim 1, wherein end surfaces of the plurality of protruding portions farther away from the nip are in direct contact with a surface of the support.

* * * * *